(12) United States Patent
Liu et al.

(10) Patent No.: US 11,734,448 B2
(45) Date of Patent: Aug. 22, 2023

(54) METHOD FOR ENCRYPTING DATABASE SUPPORTING COMPOSABLE SQL QUERY

(71) Applicant: ZHEJIANG UNIVERSITY, Zhejiang (CN)

(72) Inventors: Jian Liu, Hangzhou (CN); Xinle Cao, Hangzhou (CN); Hao Lu, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/888,521

(22) Filed: Aug. 16, 2022

(65) Prior Publication Data
US 2023/0048229 A1    Feb. 16, 2023

Related U.S. Application Data

(63) Continuation of application No. PCT/CN2021/110269, filed on Aug. 3, 2021.

(51) Int. Cl.
*G06F 21/62*    (2013.01)
*H04L 9/08*    (2006.01)

(52) U.S. Cl.
CPC ........ *G06F 21/6227* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 8,645,340 B2* | 2/2014 | Kester | H04L 63/10 709/224 |
| 8,751,826 B2* | 6/2014 | O'Connor | G06F 21/6245 380/278 |
| 2013/0191650 A1* | 7/2013 | Balakrishnan | G06F 21/6227 713/190 |
| 2018/0307763 A1* | 10/2018 | Hersans | H04L 9/3242 |

FOREIGN PATENT DOCUMENTS

| | | | |
|---|---|---|---|
| CN | 110750797 A | | 2/2020 |
| CN | 111859426 A | | 10/2020 |
| CN | 112800088 A | * | 5/2021 |
| CN | 112800088 A | | 5/2021 |

OTHER PUBLICATIONS

International Search Report (PCT /CN2021/110269); dated Apr. 27, 2022.

* cited by examiner

*Primary Examiner* — Sanchit K Sarker
(74) *Attorney, Agent, or Firm* — W&G Law Group

(57) ABSTRACT

Disclosed is a database encryption method supporting composable SQL query, which mainly comprises the following steps: (1) a user encrypting and preprocessing data based on the encryption scheme provided by the present disclosure and uploading an encryption result and preprocessed data to a service provider; (2) setting and uploading a SQL query instructions: the user uploads the query instruction to the service provider according to actual needs, and uploads auxiliary parameters for the query instruction at the same time; (3) data query: the service provider performs SQL query according to the query instruction and auxiliary parameters received from the user, saves a calculation result, updates the data and returns a query result to the user.

7 Claims, No Drawings

METHOD FOR ENCRYPTING DATABASE SUPPORTING COMPOSABLE SQL QUERY

CROSS-REFERENCE TO RELATED APPLICATIONS

The present application is a continuation of International Application No. PCT/CN2021/110269, filed on Aug. 3, 2021, the content of which is incorporated herein by reference in its entirety.

TECHNICAL FIELD

The present disclosure relates to the technical fields of discrete logarithm problem, multiplication encryption, encrypted database and searchable encryption, in particular to a database encryption method supporting composable SQL query.

BACKGROUND

A discrete logarithm problem refers to the problem of finding logarithms in a computable finite cyclic group. This problem was published by W. Diffie and E. Hellman in 1976. Up to now, the discrete logarithm problem is still considered as a hard problem to solve, and thus is widely used in encryption.

Multiplication encryption is widely used in cryptography, including well-known encryption solutions such as ElGmal and RSA. Encryption can achieve "perfect security" and ensure the multiplication homomorphism of the ciphertext, that is, the multiplication of the ciphertext is also the multiplication of the plaintext. Therefore, multiplication encryption achieves good security and operability. In 2014, a solution to encrypt a database by using the multiplication encryption solution was proposed in the SIGMOD conference, but this solution is not secure and quite different from the present disclosure.

Encryption database technology was first proposed in 2011. The first encrypted database model is CryptDB, which skillfully combines various technologies to realize various query operations of an encrypted database. However, since 2015, there have been a series of work attacks on CryptDB. These works prove that the security of CryptDB is extremely poor. Although CryptDB has landed, it should not be used for commercial activities. In 2014, a solution for encrypting a database was proposed in SIGMOD. This solution is called SDB, which puts forward a novel encryption solution, which realizes most of various query operations. However, this solution is still proved to be unsafe and difficult to apply to commercial activities.

The searchable encryption technology has developed for decades, and so far, there are many technologies used for searchable encryption, including DET (deterministic encryption) and OPE (order-preserving encryption). However, so far, these technologies have been proved to be either unsafe or too complicated to be used in real scenes. In addition, although composable SQL query is the mainstream demand of the encrypted database, no database supports safe composable SQL query at present.

With the rapid development of Internet, users (including individuals and companies) are increasingly demanding to store large-scale data (over GB). At present, it has become a mainstream trend for users to store data in the service providers that provide storage services, that is, the cloud in a broad sense. However, there are two problems when data is stored in service providers: if data is stored without encryption in service providers, the privacy of the users will be exposed to the service providers; if the data is encrypted and stored in the service provider, the user cannot operate the encrypted data safely and efficiently, especially the composable SQL query.

Therefore, how to support the operations of users' private data, especially the composable SQL query including updating, adding, searching for a specified keyword and querying a specified range, is still a problem to be solved.

SUMMARY

In view of the shortcomings of the prior art, the purpose of the present disclosure is to provide a database encryption method supporting composable SQL query.

The purpose of the present disclosure is realized by the following technical solution: a database encryption method supporting composable SQL query, includes the following steps:

(1) Encrypting stored data: a user encrypts and preprocesses his own stored data, and uploads an encryption result and preprocessed data to a service provider, who provides software, apparatuses, electronic devices or storage media for running a database to store the data uploaded by the user; the step (1) specifically comprises the following sub-steps:

(1.1) The user generating random number sets as a row key and a column key of the data for his own data; the user encrypting the data with the row key and the column key based on multiplication encryption, and outputting an encrypted database.

(1.2) The user uploading the encrypted database to the service provider, and the user selecting any encryption scheme to encrypt and upload the row key generated in step (1.1) to the service provider to realize encrypted storage of the row key, and meanwhile selectively storing the column keys locally without encryption as needed or encrypting and uploading the column keys to the service provider.

(1.3) The user preprocessing an instruction to generate auxiliary data needed to run the instruction; the user uploading the auxiliary data to the service provider, wherein the service provider cannot obtain any privacy information about the database from the auxiliary data; the instruction comprises operations of updating, inserting, deleting, adding, searching for a certain specified keyword and querying a specified range.

(1.4) The service provider selecting a storage form according to an actual situation, wherein the storage form comprises database software, apparatuses, electronic devices or storage media, and storing the encrypted data and the auxiliary data based on the storage form, and carrying out execution of subsequent instructions.

(2) Setting a composable SQL query instruction, and the user uploading the composable SQL query instruction to the service provider according to actual demands, and uploading auxiliary parameters used for the query instruction.

(3) Running the composable SQL query instruction set in step (2): the service provider runs the query instruction according to the received composable SQL query instruction and the auxiliary parameters from the user, saving a calculation result after the instruction is run, updating the data and returning a query result to the user.

Further, the step (1.1) is specifically as follows:

The user randomly generates two large prime numbers p and q to obtain a large integer $N=p \cdot q$; the user takes the large integer N as an order of an generator g and finds out the generator g on a finite field $Z_{N^2}$; the user takes the randomly generated numbers as the row key and the column key, and encrypts the database by using the row key and the column key, wherein the row key of an $i^{th}$ row is $(r_i, t_i) \in Z_N^2$; the column key of a $j^{th}$ column is $(m_j, x_j)$, where $m_j \in Z_{N^2}, x_j \in Z_N$; the row key and the column key should ensure that there is an integer $M_{(i,j)} \in Z_{N^2}$ for any i, j, so that $m_j g^{r_i x_j} \cdot M_{(i,j)} \mod N^2 = 1$, the integer $M_{(i,j)}$ is defined as an inverse of $N^2$ relative to $m_j g^{r_i x_j}$, and is denoted as $(m_j g^{r_i x_j})^{-1}$; an element $v_{(i,j)}$ in the $i^{th}$ row and the $j^{th}$ column of the database is encrypted as follows:

$$c_{(i,j)} = (N+1)^{t_i v_{(i,j)}} \cdot (m_j g^{r_i x_j})^{-1} \mod N^2.$$

Further, the step (1.3) is specifically as follows:

For the instructions of deleting and adding, the user does not need to generate auxiliary data D.

For the instructions of updating and inserting, once a user updates or inserts a row of data, it is necessary to generate a row key in advance and encrypt and store the row key in the service provider; during updating and inserting, the user downloads the row key generated in advance from the service provider, and obtains the column key from the service provider or locally, so as to decrypt and update the updated data, re-encrypt and upload the data to the service provider or directly encrypt the inserted data and upload the data to the service provider.

For the instruction of searching for a certain specified keyword, the user is allowed to select whether each row is the same keyword between two columns or whether all rows in a certain column are a certain specified keyword; if the user queries whether the same row is the same keyword between two columns, the user needs to generate a column of encrypted random numbers $\alpha_i$ (i=1, 2, ..., n) for each query, and the corresponding column key is $(m_\alpha, x_\alpha)$, and the encryption scheme is $E(\alpha_i) = (m_\alpha \cdot g^{r_i x_\alpha})^{-1} \cdot (N+1)^{t_i \alpha} \mod N^2$; the encrypted element in each row is 1, and the two columns are collectively denoted as a column S; the column key corresponding to the column S is $(m_s, x_s)$, and the element 1 in the $i^{th}$ row is encrypted as $E(1)_i = (m_s \cdot g^{r_i x_s})^{-1} \cdot 1 \mod N^2$, where $m_s$ has an inverse $m_s^{-1} \in Z_{N^2}$ for $N^2$, that is $m_s \cdot m_s^{-1} \mod N^2 = 1$; $x_s$ has an inverse $x_s^{-1} \in Z_N$ for N, that is, $x_s \cdot x_s^{-1} \mod N = 1$; a list of random numbers $h_i^{e_i}$ (i=1, 2, ..., n), where $h_i$ is a $N_2$ order generator on $Z_{N_1}$, $N_1$ is product of two or more random large prime numbers, and $N_2$ is any one of the large prime numbers, that is, $N_2$ is divisible by $N_1$, $e_i$ is a random integer on $Z_{N_2}$; a list of numbers $h^{e_i(t_i \cdot \alpha_i \mod N) \mod N_2}$ (i=1, 2, ..., N); if the user queries whether all rows of a certain column are a certain specified keyword, the user needs to generate an additional encrypted column of $\gamma$ for every query in addition to the auxiliary data needed to compare whether each row is the same keyword between the above two columns, that is, the encrypted element of each row is $\gamma$, and the corresponding column key is $(m_\gamma, x_\gamma)$, and the element in the $i^{th}$ row is encrypted as $E(\gamma)_i = (m_\gamma \cdot g^{r_i x_\gamma})^{-1} \cdot (N+1)^{t_i \gamma}$, where $\gamma$ is a random number on $Z_N$, and $\gamma$ should guarantee the existence of an inverse $\gamma^{-1} \in Z_N$ relative to N, that is, $\gamma \cdot \gamma^{-1} \mod N = 1$.

For the instruction of querying the specified range, the user selects two columns to compare with each other or one column to compare with the same constant to query the specified range; if the user compares the two columns, it needs to generate a column of encrypted random numbers $\alpha_i$ (i=1, 2, ..., n) for each comparison operation, the corresponding column key is $(m_\alpha, x_\alpha)$, and the encryption scheme is $E(\alpha_i) = (m_\alpha \cdot g^{r_i x_\alpha})^{-1} \cdot (N+1)^{t_i \alpha} \mod N^2$; the encrypted element in each row is 1, and the two columns are collectively denoted as a column S; the column key corresponding to the column S is $(m_s, x_s)$, and the element 1 in the $i^{th}$ row is encrypted as $E(1)_i = (m_s \cdot g^{r_i x_s})^{-1} \cdot 1 \mod N^2$, where $m_s$ has an inverse of $m_s^{-1} \in Z_{N^2}$ relative to $N^2$, that is, $m_s \cdot m_s^{-1} \mod N^2 = 1$; $x_s$ has an inverse of $x_s^{-1} \in Z_N$ relative to N, that is $x_s \cdot x_s^{-1} \mod N = 1$; a column $\beta_i \cdot t_i^{-1}$ (i=1, 2, ..., n), a column $u_i = \beta_i \cdot \alpha_i$, where $t_i^{-1} \in Z_N$ is an inverse of $t_i$ relative to, that is $t_i^{-1} \cdot t_i \mod N = 1$, $\beta_i$, $u_i$ is a random number on $Z_N$ and satisfies $$0 \ll u_i \ll \beta_i \ll \frac{N}{2};$$

if the user compares a column with the same constant, the user needs to generate an additional encrypted column of $\gamma$ in addition to the auxiliary data needed for the comparison between the two columns, that is, the encrypted element in each row is $\gamma$, the corresponding column key is $(m_\gamma, x_\gamma)$, and the element in the $i^{th}$ row is encrypted as $E(\gamma)_i = (m_\gamma \cdot g^{r_i x_\gamma})^{-1} \cdot (N+1)^{t_i \gamma}$, where $\gamma$ is a random number on $Z_N$, and $\gamma$ should guarantee the existence of an inverse $\gamma^{-1} \in Z_N$ relative to N, that is, $\gamma \cdot \gamma^{-1} \mod N = 1$.

Further, the step (2) specifically comprises the following sub-steps:

(2.1) The users uploading operation instructions to the service provider according to actual business needs; wherein the operation instructions comprise updating, adding, searching for a certain specified keyword and querying a specified range.

(2.2) The user calculating the auxiliary parameters according to the uploaded instructions, and uploading the auxiliary parameters to the service provider along with the instructions or after receiving a request of the service provider:

The step (2.2) is specifically as follows: the user does not need to calculate any auxiliary parameters for the operations of updating, inserting and deleting; for the operation of adding, if a column A and a column B are added, and the corresponding column keys are $(m_A, x_A)$ and $(m_B, m_B)$, the column key of a newly generated column C=A+B is calculated and stored by the user; the corresponding calculation mode is $(m_C = m_A \cdot m_B \mod N^2, x_C = x_A + x_B \mod N)$; the user chooses to store the key locally without encryption or encrypt and upload the key to the service provider for storage; for the instruction of searching for a certain specified keyword, the user selects to query whether each row is the same keyword between two columns or whether all rows of a certain column are a certain specified keyword; if the user queries whether each row is the same keyword between two columns such as the column A and the column B, and the corresponding column keys are $(m_A, x_A)$ and $(m_B, x_B)$, the user needs to calculate:

(I) The column key $(m_{A'} = m_A \cdot m_B^{-1} \cdot m_\alpha \mod N^2, x_{A'} = x_A - x_B + x_\alpha \mod N)$ of a column $A' = A - B + \alpha$.

(II) Calculating the auxiliary parameter $\zeta = -x_s^{-1} x_{A'} \mod N$, $\eta = m_A \cdot m_s^\zeta \mod N^2$ to obtain the auxiliary parameter $(\zeta, \eta)$ uploaded by the user at last.

If the user queries whether all rows in a certain column such as the column A, are a certain specified keyword such as v, the user needs to calculate:

(I) $v \cdot \gamma^{-1}$, where $\gamma$ is the auxiliary data in step (1.3).

(II) The column key $(m_{\gamma'} = m_\gamma^{v \cdot \gamma^{-1}} \mod N^2, x_{\gamma'} = v \cdot \gamma^{-1} \cdot x_\gamma \mod N)$ of the column $\gamma' = E(\gamma)^{v \cdot \gamma^{-1}}$, where the column $\gamma'$ is a new column calculated by the service provider from $\gamma$, and the $i^{th}$ element $E(\gamma')_i$ of the column $\gamma'$ is calculated from the $i^{th}$ element $E(\gamma)_i$ of the column $\gamma$: $E(\gamma')_i = E(\gamma)_i^{v \cdot \gamma^{-1}} \mod N^2$.

(III) The column key $(m_{A'} = m_A \cdot (m_{\gamma'})^{-1} \cdot m_\alpha \mod N^2, x_{A'} = x_A - x_{\gamma'} + x_\alpha \mod N)$ of a column $A' = A - \gamma' + \alpha$.

(IV) Calculating the auxiliary parameter P: $\zeta=-x_S^{-1}x_{A'}$ mod N, $\eta=M_A m_s^\zeta$ mod $N^2$; obtaining the auxiliary parameter $(v\cdot\gamma^{-1}, \zeta, \eta)$ uploaded by the user at last;

for the instruction of querying a specified range, the user selects to compare the values of two columns with each other or compare the value of a column with the same constant to query the specified range; if the user compares the values between the same rows of the two columns, for example the column A and the column B, and the column keys corresponding to the two columns are $(m_A, x_A)$ and $(m_B, x_B)$, the user needs to calculate:

(I) The column key $(m_{A'}=m_A\cdot m_B^{-1}\cdot m_\alpha$ mod $N^2$, $x_{A'}=x_A-x_B+x_\alpha$ mod N) of the column $A'=A-B+\alpha$; (2) $\zeta=-X_S^{-1}X_{A'}$ mod N, $\eta=M_A m_s^\zeta$ mod $N^2$; obtaining the auxiliary parameter $(\zeta,\eta)$ uploaded by the user at last.

If the user compares the values of all rows in a certain column, for example the column A, with the same constant, for example v, the user needs to calculate:

(I) $v\cdot\gamma^{-1}$, where $\gamma$ is the auxiliary data in step (1.3).

(II) Calculating the column key $(m_{\gamma'}=m_\gamma^{v\cdot\gamma^{-1}}$ mod $N^2$, $x_{\gamma'}=v\cdot\gamma^{-1}\cdot x_\gamma$ mod N) of the column $\gamma'$, wherein the column $\gamma'$ is a new column calculated by the service provider from the column $\gamma$, and the $i^{th}$ row element $E(\gamma')_i$ of the column $\gamma'$ is calculated from the $i^{th}$ row element $E(\gamma)_i$ of the column $\gamma$: $E(\gamma')_i=E(\gamma)_i^{v\cdot\gamma^{-1}}$ mod $N^2$.

(III) Calculating the column key $(m_{A'}=m_A\cdot(m_{\gamma'})^{-1}\cdot m_\alpha$ mod $N^2$, $x_{A'}=x_A-x_{\gamma'}+x_\alpha$ mod N) of the column $A'=A-\gamma'+\alpha$.

(IV) Calculating the auxiliary parameter $\zeta=-x_S^{-1}x_{A'}$ mod N, $\eta=m_A m_s^\zeta$ mod $N^2$; obtaining the auxiliary parameter $(v\cdot\gamma^{-1}, \zeta, \eta)$ uploaded by the user at last.

Further, the step (3) specifically comprises the following sub-steps:

(3.1) The service provider performing corresponding calculation and operation after receiving the composable SQL query instruction of the user, and putting forward a request for the auxiliary parameters to the user according to the requirements in the calculation or selecting required parameters from the auxiliary parameters uploaded by the user along with the instruction.

(3.2) The service provider carrying out calculation according to the instruction after receiving the auxiliary parameters, saves the calculation result after the instruction is run, updates the data and return the query result to the user.

Further, the step (3.1) is specifically as follows: for the instruction of deleting, the service provider only needs to perform a normal deletion operation and update the database; for operations of insertion and update, if the user encrypts and stores the row key and column key at the service provider, the service provider only needs to return the row key and column key requested by the user and receive the new data uploaded by the user for normal insertion and update; for the operation of addition, if the column A and the column B are added to get a column C, the service provider calculates the $i^{th}$ row element $C_i$ of the column C as follows: $C_i=A_i\times B_i$ (i=1, 2, 3, . . . n), where $A_i$ and $B_i$ represent the $i^{th}$ row elements of the column A and the column B respectively; in the operation of the above instructions, the service provider does not need the user to provide any auxiliary parameters.

For the operation of searching for a certain specified keyword, the user selects to query whether each row is the same keyword between two columns or whether all rows in a certain column are a certain specified keyword; if the user queries whether each row is the same keyword between two columns, for example the column A and the column B, and the corresponding column keys are $(m_A, x_A)$ and $(m_B, x_B)$, the service provider performs the following calculations:

(I) Calculating a column B' as follows: the $i^{th}$ row element $B'_i=B_i^{N-1}$ mod $N^2$ of the column B', where $B_i$ is the $i^{th}$ row element of the column B.

(II) Calculating a column A' as follows: the $i^{th}$ row element $A'_i=A_i\times B'_i\times E(\alpha)_i$ mod $N^2$ of the column A', where $A_i$ is the $i^{th}$ row element of the column A and $E(\alpha)_i$ is the $i^{th}$ row element of the column $\alpha$ of the auxiliary data in step (1.3).

(III) The service provider requesting the auxiliary parameter P to the user or selects the required parameter from the auxiliary parameters uploaded by the user along with the instruction.

If the user queries whether all the rows in a certain column, for example the column A, are an external keyword, for example v, the service provider directly asks the user for auxiliary parameters or selects the required parameters from the auxiliary parameters uploaded by the user along with the instruction.

For the instruction of querying a specified range, the user may select to compare the values of two columns with each other or the value of a certain column with the same constant to query the specified range; if the user compares the values of two columns, for example the column A and the column B, and the corresponding column keys are $(m_A, x_A)$ and $(m_B, x_B)$, the service provider carries out the following calculations:

(I) Calculating the column B' as follows: the $i^{th}$ row element $i^{th}$ $B'_i=B_i^{N-1}$ mod $N^2$ of the column B', where $B_i$ is the $i^{th}$ row element of the column B.

(II) Calculating the column A' as follows: the $i^{th}$ row element $A'_i=A_i\times B'_i\times E(\alpha)_i$ mod $N^2$ of the column A', where $A_i$ is the $i^{th}$ row element of the column A and $E(\alpha)_i$ is the $i^{th}$ row element of the column $\alpha$ of the auxiliary data in step (1.3).

(III) The service provider puts forward a request for the auxiliary parameters to the user or selects the required parameters from the auxiliary parameters uploaded by the user along with the instruction.

If the user compares the values of all the rows in a certain column, for example the column A, with the same constant, for example v, the service provider directly puts forward a request for the auxiliary parameters to the user or selects the required parameters from the auxiliary parameters uploaded by the user along with the instruction.

Further, the step (3.2) is specifically as follows: for the operation of searching for a specified keyword, the user selects to query whether each row is the same keyword between two columns or whether all rows in a certain column are a certain specified keyword; if the user queries whether each row is the same keyword between two columns, for example the column A and the column B, and the corresponding column keys are $(m_A, x_A)$ and $(m_B, x_B)$, the service provider receives the auxiliary parameter $(\zeta,\eta)$ calculated and uploaded by the user in step (2), and carries out the following calculations:

(I) Calculation of a column a, wherein the $i^{th}$ row element $a_i$ of the column a is calculated as follows: $a_i=A'_i\times\eta\times E(1)_i^\zeta$ mod $N^2$, where $A'_i$ is the $i^{th}$ row element of the column A' in step (3.1) and $E(1)_i$ is the $i^{th}$ row element of the column S of the auxiliary data in step (1.3).

(II) Calculation of a column H, wherein the $i^{th}$ row element $H_i$ of the column H is calculated as follows: $H_i=(h_i^{e_i})^{a_i}$ mod $N_1$, where, $h_i^{e_i}$ is the $i^{th}$ row element of the column h of the auxiliary data in step (1.3), $N_1$ is the $N_1$ described in step (1.3); (III) comparison of $(h^{e_i\cdot(t_i\cdot\alpha_i \bmod N) \bmod N_2}, H_i)$, where $h^{e_i\cdot(t_i\cdot\alpha_i \bmod N) \bmod N_2}$ is the $i^{th}$ row element of the column h' of the auxiliary data in the step (1.3), and if they are equal, the elements in the $i^{th}$ rows of the column A and the column B are equal; if not, the elements in the $i^{th}$ rows of the column A and the column B are not equal.

If the user queries whether all the rows in a certain column, for example the column A, are an external keyword, for example v, the service provider receives the auxiliary parameter (v·$\gamma^{-1}$, $\zeta$, $\eta$) uploaded by the user and carries out the following calculations:

(I) Calculation of the column $\gamma'$, where $\gamma'$ is a new column calculated by the service provider according to the column $\gamma$ in the auxiliary data in step (1.3) and the calculated auxiliary parameter P uploaded by the user, and the $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}} \bmod N^2$.

(II) Calculation of the column A' as follows: the $i^{th}$ row element $A'_i = A_i \times E(\gamma')_i^{N-1} \times E(\alpha)_i \bmod N^2$ of the column A', where $A_i$ is the $i^{th}$ row element of the column A and $E(\alpha)_i$ is the $i^{th}$ row element of the column $\alpha$ in the auxiliary data in step (1.3).

(III) Calculation of the column a, wherein the $i^{th}$ row element of the column a is calculated as follows: $a_i = A'_i \times \eta \times E(1)_i^{\zeta} \bmod N^2$, where $A'_i$ is the $i^{th}$ row element of the column A' in step (3.1) and $E(1)_i$ is the $i^{th}$ row element of the column S in the auxiliary data in step (1.3).

(IV) Calculation of the column H, wherein the $i^{th}$ row element $H_i$ of the column H is calculated as follows: $H_i = (h_i^{e_i})^{a_i} \bmod N_1$, wherein, $h_i^{e_i}$ is the $i^{th}$ row element of the column h in the auxiliary data in step (1.3), and $N_1$ is the $N_1$ described in step (1.3);

(V) Comparison of $(h^{e_i \cdot (t_i \cdot \alpha_i \bmod N) \bmod N_2}, H_i)$, where $h^{e_i \cdot (t_i \cdot \alpha_i \bmod N) \bmod N_2}$ is the $i^{th}$ row element of the column h' in the auxiliary data in step (1.3); if they are equal, the element in the $i^{th}$ row of the column A is equal to v; if they are not equal, the element in the $i^{th}$ row of the column A is not equal to v.

For the instruction of querying a specified range, the user selects to compare the values of two columns with each other or the value of a certain column with the same constant to query the specified range; if the user compares the values of the same rows between two columns, for example the column A and the column B, and the corresponding column keys of the two columns are ($m_A$, $x_A$) and ($m_B$, $x_B$), then the service provider receives the auxiliary parameter P: ($\zeta$, $\eta$) uploaded by the user, and carries out the following calculations:

(I) Calculation of the column a, wherein the $i^{th}$ row element $a_i$ of the column a is calculated as follows: $a_i = A'_i \times \eta \times E(1)_i^{\zeta} \bmod N^2$, where $A'_i$ is the $i^{th}$ row element of the column A' in step (3.1) and $E(1)_i$ is the $i^{th}$ row element of the column S in the auxiliary data in step (1.3).

(II) Calculation of the column a', wherein the $i^{th}$ row element $a'_i$ of the column a' is calculated as follows: $a'_i = a_i \times (\beta_i \cdot t_i^{-1}) + u_i - \beta_i \alpha_i \bmod N$, where $\beta_i t_i^{-1}$ is the $i^1$ row element of the column $\beta$ in the auxiliary data in step (1.3), and $u_i - \beta_i \alpha_i$ is the $i^{th}$ row element of the column u in step (1.3).

(III) Comparison of $a'_i$ with $$\frac{N}{2},$$

wherein if $$a'_i > \frac{N}{2},$$

the element in the $i^{th}$ row of the column A is smaller; if not, the element in the $i^{th}$ row of the column B is not greater than the element in the $i^{th}$ row of the column A.

If the user compares the values of all rows in a certain column, for example, the column A, with the same constant, for example v, the service provider receives the auxiliary parameter (v·$\gamma^{-1}$, $\zeta$, $\eta$) uploaded by the user and carries out the following calculations:

(I) Calculation of the column $\gamma'$, wherein $\gamma'$ is a new column calculated by the service provider according to the column $\gamma$ in the auxiliary data in step (1.3) and the calculated auxiliary parameter P uploaded by the user, and the $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}} \bmod N^2$.

(II) Calculation of the column A' as follows: the $i^{th}$ row element $A'_i = A_i \times E(\gamma')_i^{N-1} \times E(\alpha)_i \bmod N^2$ (i=1, 2, ..., n) of the column A', where $A_i$ is the $i^{th}$ row element of the column A and $E(\alpha)_i$ is the $i^{th}$ row element of the column $\alpha$ in the auxiliary data in step (1.3).

(III) Calculation of the column a, wherein the $i^{th}$ row element $a_i$ of the column a is calculated as follows: $a_i = A'_i \times \eta \times E(1)_i^{\zeta} \bmod N^2$, where $A'_i$ is the $i^{th}$ row element of the column A' in step (3.1) and $E(1)_i$ is the $i^{th}$ row element of the column S in the auxiliary data in step (1.3).

(IV) Calculation of the column a', wherein the $i^{th}$ row element $a'_i$ of the column a' is calculated as follows: $a'_i = a_i \times (\beta_i \cdot t_i^{-1}) + u_i - \beta_i \alpha_i \bmod N$, where $\beta_i t_i^{-1}$ is the $i^1$ row element of the column $\beta$ in the auxiliary data in step (1.3) and $u_i - \beta_i \alpha_i$ is the $i^{th}$ row element of the column u in step (1.3).

(V) Comparison of $a'_i$ with $$\frac{N}{2},$$

wherein if $$a'_i < \frac{N}{2},$$

the element in the $i^{th}$ row of the column A is not less than v; otherwise, the element in the $i^{th}$ row of the column A is less than v.

According to the above technical solution, the present disclosure has the following beneficial effects:

1. Based on the discrete logarithm problem, the present disclosure realizes the encryption protection of user data and reduces the leakage of user privacy information, thus providing a safe and complete protection solution for cloud storage of user data in actual commercial activities.

2. The present disclosure realizes the safe and efficient execution of the composable SQL query instructions on the encrypted data, including updating, inserting, deleting, adding, searching for a specified keyword and querying a specified range, and meets the requirements of users for remote operations and query of cloud storage data in actual commercial activities.

3. The present disclosure has the advantages of strong universality, safety and high efficiency, privacy protection, simple and convenient use, high efficiency, less memory and time consumption, and the like.

DESCRIPTION OF EMBODIMENTS

In order to make the purpose, technical solution and advantages of this application clearer, the technical solution of this application will be clearly and completely described below with reference to the specific embodiments of this application and the corresponding drawings. Obviously, the described embodiments are only part of, not all of the embodiments of this application. Based on the embodiments in this application, all other embodiments obtained by those skilled in the art without creative labor belong to the scope of protection in this application.

Embodiment 1

Supposing that a user A of a sales company stores his own data set M in a service provider B, and asks the service provider B not to get any information about M. In addition, the user A requires that the data set M can be operated without revealing privacy (operations include but are not limited to updating, inserting, deleting, adding, searching for specified keywords and querying a specified range, for example returning orders with a transaction volume greater than 5000). To solve this situation, the database encryption method supporting composable SQL query of the present disclosure is used to meet the requirements of the user A, which specifically includes the following steps:

(1) Encrypting stored data: the user A encrypts and preprocesses data M, and uploads the encryption result and preprocessed data to the service provider B, which provides software, apparatuses, electronic devices or storage media for running a database for storing the data uploaded by the user.

Specifically, in step (1.1), the user A generates random number sets R and C as a row key and a column key of the database M, respectively; based on multiplication encryption, the user A encrypts data with the keys R and C, and outputs the encrypted database.

Specifically, the user A randomly generates two large prime numbers p and q to obtain a large integer N=p·q; the user takes the large integer N as an order of an generator g and finds out the generator g on a finite field $Z_{N^2}$; the user takes the randomly generated numbers as the row key and the column key, and encrypts the database M by using the row key and the column key, wherein the row key of an $i^{th}$ row is $(r_i, t_i) \in Z_N^2$; the column key of a $j^{th}$ column is $(m_j, x_j)$, where $m_j \in Z_{N^2}$, $x_j \in Z_N$; the row key and column key should ensure that there is an integer $M_{(i,j)} \in Z_{N^2}$ for any i, j, so that $m_j g^{r_i x_i} \cdot M_{(i,j)}$ mod $N^2=1$, the integer $M_{(i,j)}$ is called an inverse of $N^2$ relative to $m_j g^{r_i x_i}$, and is marked as $(m_j g^{r_i x_i})^{-1}$; an element $v_{(i,j)}$ in the $i^{th}$ row and the $j^{th}$ column of the database M is encrypted as follows:

$$c_{(i,j)} = (N+1)^{t_i v_{(i,j)}} \cdot (m_j g^{r_i x_i})^{-1} \text{ mod } N^2;$$

In step (1.2), the user A uploads the encrypted database M to the service provider B; in addition, the user A chooses any safe encryption scheme to encrypt a random number set R and uploads the encrypted random number set R to the service provider B; the user A can also choose to store a random number set C locally without encryption or uploads it with encryption to the service provider B as needed;

Specifically, in the whole process, assuming that the database has elements of n rows and m columns; in addition to the encrypted database ciphertext, the user A will upload n encrypted row keys to the service provider B at the same time, and store m column keys locally without encryption or upload the m column keys with encryption to the service provider B; any safe encryption scheme, for example AES encryption, may be adopted for the encryption schemes of row keys and column keys; the encrypted database and the encrypted row keys are collectively referred to as the encryption result, and the encryption result is uploaded by the user A to the service provider B for storage; the service provider B cannot obtain any sensitive information about the database M of the user A from the encryption result; if the user A needs to restore the plaintext of the database elements, it needs to download the encryption elements and the corresponding row keys from service provider B at the same time; if the column keys are encrypt and uploaded to the service provider B, the user A needs to download the column keys corresponding to the encryption elements; if that column keys are stored without encryption locally by the user A, then the user A only needs to find the corresponding column keys of the encrypt elements locally; if the user A needs to query a column in the database, the user A needs the column key of this column; if the column key is encrypted and uploaded to the service provider B, the user A needs to download the column key of this column from the service provider B; if the column key is stored without encryption locally by the user A, then the user A only needs to find the column key of this column locally.

In step (1.3), the user A preprocesses the instruction to generate auxiliary data D required for executing the instruction; the user A uploads the auxiliary data D to the service provider B, and the service provider B cannot obtain any privacy information about the database M from the auxiliary data D; the service provider B must obtain the auxiliary parameter P calculated by the user A before performing the specified operation; the instructions include, but are not limited to, updating, inserting, deleting, adding, searching for specified keywords, querying the specified range, and the like;

Specifically, for the instructions of deleting and adding, the user A does not need to generate auxiliary data D; for the instructions of updating and inserting, once the user A updates or inserts a row of data, it is necessary to generate a row key in advance and encrypt and store the row key in the service provider B; during updating and inserting, the user A downloads the row key generated in advance from the service provider B, and obtains the column key from the service provider B or locally, so as to decrypt and update the updated data, re-encrypt and upload the data to the service provider B or directly encrypt the inserted data and upload the data to the service provider B; for the instruction of searching for a certain specified keyword, the user A can select whether each row is the same keyword between two columns or whether all rows in a certain column are a certain specified keyword; if the user A queries whether the same row is the same keyword between two columns, the user A needs to generate a column of encrypted random numbers $\alpha_i$ (i=1, 2, ..., n) (collectively referred to as a column $\alpha$) for each query, and the corresponding column key is $(m_\alpha, x_\alpha)$, and the encryption scheme is $E(\alpha_i) = (m_\alpha \cdot g^{r_i x_\alpha})^{-1} \cdot (N+1)^{t_i \alpha_i}$ mod $N^2$; the encrypted element in each row is 1, and this column is collectively called a column S; the column key corresponding to the column S is $(m_s, x_s)$, and the element 1 in the $i^{th}$ row is encrypted as $E(1)_i = (m_s \cdot g^{r_i x_s})^{-1} \cdot 1$ mod $N^2$, where $m_s$ has an inverse $m_s^{-1} \in Z_{N^2}$ for $N^2$, that is $m_s \cdot m_s^{-1}$ mod $N^2 = 1$; $x_s$ has an inverse $x_s^{-1} \in Z_N$ for N, that is, $x_s \cdot x_s^{-1}$ mod N=1; a list of random numbers $h_i^{e_i}$(i, =1, 2, ..., n) ( ) where $h_i$ is a $N_2$ order generator on $Z_{N_1}$, $N_1$ is product of two or more random large prime numbers, and $N_2$ is any one of the large prime numbers, that is, $N_2$ is divisible by $N_1$, $e_i$ is a random integer on $Z_{N_2}$; a list of numbers $h^{e_i(t_i \cdot \alpha_i \text{ mod } N) \text{ mod } N_2}$ (i=1, 2, ..., N) (collectively referred to as a column h'); if 2 (i=the user A queries whether all rows of a certain column are a certain specified keyword, the user A needs to generate an additional encrypted column of γ for every query (i.e., the encrypted elements in each row are γ, and this column is collectively referred to as a column γ) in addition to the auxiliary data needed to compare whether each row is the same keyword between the above two columns, that is, the encrypted element of each row is γ, and the corresponding column key is $(m_\gamma, x_\gamma)$, and the element in the $i^{th}$ row is encrypted as $E(\gamma)_i=(m_\gamma \cdot g^{r_i x_\gamma})^{-1} \cdot (N+1)^{t_i \gamma}$, where γ is a random number on $Z_N$, and γ should guarantee the existence of an inverse $\gamma^{-1} \in Z_N$ relative to N, that is, $\gamma \cdot \gamma^{-1}$ mod N=1; for the instruction of querying the specified range, the user A selects two columns to compare with each other or one column to compare with the same constant to query the specified range; if the user compares the two columns, it needs to generate a column of encrypted random numbers $\alpha_i (i=1, 2, \ldots, n)$ (collectively referred to as a column α) for each comparison operation, the corresponding column key is $(m_\alpha, x_\alpha)$, and the encryption scheme is $E(\alpha_i)=(m_\alpha \cdot g^{r_i x_\alpha})^{-1} \cdot (N+1)^{t_i \alpha}$ mod $N^2$; the encrypted element in each row is 1, and this column is collectively called a column S; the column key corresponding to the column S is $(m_s, x_s)$, and the element 1 in the $i^{th}$ row is encrypted as $E(1)_i=(m_s \cdot g^{r_i x_s})^{-1} \cdot 1$ mod $N^2$, where $m_s$ has an inverse of $m_s^{-1} \in Z_{N^2}$ relative to $N^2$, that is, $m_s \cdot m_s^{-1}$ mod $N^2=1$; $x_s$ has an inverse of $x_s^{-1} \in Z_N$ relative to N, that is $x_s \cdot x_s^{-1}$ mod N=1; a column $\beta_i \cdot t_i^{-1}$ (i=1, 2, \ldots, n) (collectively referred to as a column β), a column $u_i - \beta_i \cdot \alpha_i$ (collectively referred to as a column u), where $t_i^{-1} \in Z_N$ is an inverse of $t_i$ relative to, that is $t_i^{-1} \cdot t_i$ mod N=1, $\beta_i$, $u_i$ is a random number on $Z_N$ and satisfies $0 \ll u_i \ll \beta_i \ll N/2$; if the user A compares a column with the same constant, the user needs to generate an additional encrypted column of γ (i.e., the encrypted elements in each row are γ, and this column is collectively referred to as a column γ) in addition to the auxiliary data needed for the comparison between the two columns, that is, the encrypted element in each row is γ, the corresponding column key is $(m_\gamma, x_\gamma)$, and the element in the $i^{th}$ row is encrypted as $E(\gamma)_i=(m_\gamma \cdot g^{r_i x_\gamma})^{-1} \cdot (N+1)^{t_i \gamma}$, where γ is a random number on $Z_N$, and γ should guarantee the existence of an inverse $\gamma^{-1} \in Z_N$ relative to N, that is, $\gamma \cdot \gamma^{-1}$ mod N=1.

The above column α, column S, and column γ of the auxiliary data can be used for instructions of searching for a specified keyword or querying a specified range. All the above auxiliary data should be uploaded to the service provider B before the query instruction is uploaded, and the service provider B can complete the query instruction with the help of the auxiliary data, thus greatly improving the execution efficiency of the query instruction.

In step (1.4), the service Provider B selects database software, apparatuses, electronic devices or storage media according to the actual situation to store the encrypted M, the random number set R and the auxiliary data D, and performs subsequent instruction execution based on this mode.

In step (2), a composable SQL query instruction is set, and the user A uploads the instruction to the service provider B according to the actual demand, and calculates and uploads the auxiliary parameter P for executing the instruction.

Specifically, in step (2.1), the users A uploads operation instructions to the service provider B according to actual business needs; wherein the operation instructions include updating, adding, searching for a certain specified keyword and querying a specified range;

in step (2.2), the user A calculates the auxiliary parameter P according to the uploaded instruction Q, and uploading the auxiliary parameter P to the service provider B along with the instruction or after receiving a request of the service provider B.

Specifically, the user A does not need to calculate any auxiliary parameter P for the operations of updating, inserting and deleting; for the operation of adding, if a column A and a column B are added, and the corresponding column keys are $(m_A, x_A)$ and $(m_B, x_B)$, the column key of a newly generated column C=A+B is calculated and stored by the user A; the corresponding calculation mode is $(m_C=m_A \cdot m_B$ mod $N^2$, $x_C=x_A+x_B$ mod N); the user A chooses to store the key locally without encryption or encrypt and upload the key to the service provider b for storage; for the instruction of searching for a certain specified keyword, the user selects to query whether each row is the same keyword between two columns or whether all rows of a certain column are a certain specified keyword.

If the user queries whether each row is the same keyword between two columns, for example the column A and the column B, and the corresponding column keys are $(m_A, x_A)$ and $(m_B, x_B)$, the user needs to calculate:

(I) The column key $(m_{A'}=m_A \cdot m_B^{-1} \cdot m_\alpha$ mod $N^2$, $x_{A'}=x_A-x_B+x_\alpha$ mod N) of a column A'=A−B+α.

(II) Calculating the auxiliary parameter P: $\zeta=-x_s^{-1} x_{A'}$ mod N, $\eta=M_A \cdot m_s^\zeta$ mod $N^2$ to obtain the auxiliary parameter P uploaded by the user A at last as (ζ, η).

If the user A queries whether all rows in a certain column, for example the column A, are a certain specified keyword, for example v, the user A needs to calculate:

(I) $v \cdot \gamma^{-1}$, where γ is the auxiliary data in step (1.3);

(II) The column key $(m_{\gamma'}=m_\gamma^{v \cdot \gamma^{-1}}$ mod $N^2$, $x_{\gamma'}=v \cdot \gamma^{-1} \cdot x_\gamma$ mod N) of the column $\gamma'=E(\gamma)^{v \cdot \gamma^{-1}}$, where the column γ' is a new column calculated by the service provider from γ, and the $i^{th}$ element $E(\gamma')_i$ of the column γ' is calculated from the $i^{th}$ element $E(\gamma)_i$ of the column γ: $E(\gamma')_i=E(\gamma)_i^{v \cdot \gamma^{-1}}$ mod $N^2$.

(III) The column key $(m_{A'}=m_A \cdot (m_{\gamma'})^{-1} \cdot m_\alpha$ mod $N^2$, $x_{A'}=x_A-x_{\gamma'}+x_\alpha$ mod N) of a column A'=A−γ'+α.

(IV) Calculating the auxiliary parameter P: $\zeta=-x_s^{-1} x_{A'}$ mod N, $\eta=m_A \cdot m_s^\zeta$ mod $N^2$; obtaining the auxiliary parameter $(v \cdot \gamma^{-1}, \zeta, \eta)$ uploaded by the user at last;

for the instruction of querying a specified range, the user A may select to compare the values of two columns with each other or compare the value of a column with the same constant to query the specified range; if the user A compares the values between the same rows of the two columns, for example the column A and the column B, and the column keys corresponding to the two columns are $(m_A, x_A)$ and $(m_B, x_B)$, the user A needs to calculate:

(I) The column key $(m_{A'}=m_A \cdot m_B^{-1} \cdot m_\alpha$ mod $N^2$, $x_{A'}=x_A-X_B+x_\alpha$ mod N) of the column A'=A−B+α; (2) $\zeta=-x_s^{-1} x_{A'}$ mod N, $\eta=M_A \cdot m_s^\zeta$ mod $N^2$; obtaining the auxiliary parameter (ζ,η) uploaded by the user at last.

If the user A compares the values of all rows in a certain column, for example the column A, with the same constant, for example v, the user A needs to calculate:

(I) $v \cdot \gamma^{-1}$, where γ is the auxiliary data in step (1.3);

(II) Calculating the column key $(m_{\gamma'}=m_\gamma^{v \cdot \gamma^{-1}}$ mod $N^2$, $x_{\gamma'}=v \cdot \gamma^{-1} \cdot x_\gamma$ mod N) of the column γ', wherein the column γ' is a new column calculated by the service provider from the column γ, and the $i^{th}$ row element $E(\gamma')_i$ of the column γ' is calculated from the $i^{th}$ row element $E(\gamma)_i$ of the column γ: $E(\gamma')_i=E(\gamma)_i^{v \cdot \gamma^{-1}}$ mod $N^2$.

(III) Calculating the column key $(m_{A'}=m_A \cdot (m_{\gamma'})^{-1} \cdot m_\alpha$ mod $N^2$, $x_{A'}=x_A-x_{\gamma'}+x_\alpha$ mod N) of the column A'=A−γ'+α.

(IV) Calculating the auxiliary parameter P: $\zeta=-x_s^{-1} x_{A'}$ mod N, $\eta=m_A \cdot m_s^\zeta$ mod $N^2$; obtaining the auxiliary parameter $(v \cdot \gamma^{-1}, \zeta, \eta)$ uploaded by the user at last.

In step (3), the composable SQL query instruction set in step (2) is run: the service provider B runs the query instruction according to the received composable SQL query instruction and the auxiliary parameter P from the user, saves a calculation result after the instruction is run, updates the data and returns a query result U to the user A, which includes the following sub-steps:

(3.1) The service provider B performing corresponding calculation and operation after receiving the composable SQL query instruction of the user, and putting forward a request for the auxiliary parameter P to the user A according to the requirements in the calculation or selecting required parameters from the auxiliary parameter P uploaded by the user A along with the instruction.

Specifically, for the instruction of deleting, the service provider B only needs to perform a normal deletion operation and update the database; for operations of insertion and update, if the user A encrypts and stores the row key and column key at the service provider B, the service provider B only needs to return the row key and column key requested by the user A and receive the new data uploaded by the user A for normal insertion and update; for the operation of addition, if the column A and the column B are added to get a column C, the service provider B calculates the $i^{th}$ row element $C_i$ of the column C as follows: $C_i=A_i \times B_i$ (i=1,2, 3, ... n), where $A_i$ and $B_i$ represent the $i^{th}$ row elements of the column A and the column B respectively; in the operation of the above instructions, the service provider B does not need the user A to provide any auxiliary parameters.

For the operation of searching for a certain specified keyword, the user A may select to query whether each row is the same keyword between two columns or whether all rows in a certain column are a certain specified keyword; if the user A queries whether each row is the same keyword between two columns, for example the column A and the column B, and the corresponding column keys are $(m_A, x_A)$ and $(m_B, x_B)$, the service provider B performs the following calculations:

(I) Calculating a column B' as follows: the $i^{th}$ row element $B'_i=B_i^{N-1} \mod N^2$ of the column B', where $B_i$ is the $i^{th}$ row element of the column B.

(II) Calculating a column A' as follows: the $i^{th}$ row element $A'_i=A_i \times B'_i \times E(\alpha)_i \mod N^2$ of the column A', where $A_i$ is the $i^{th}$ row element of the column A and $E(\alpha)_i$ is the $i^{th}$ row element of the column α of the auxiliary data in step (1.3).

(III) The service provider B requesting the auxiliary parameter P to the user or selects the required parameter from the auxiliary parameter P uploaded by the user A along with the instruction.

If the user A queries whether all the rows in a certain column, for example the column A, are an external keyword, for example v, the service provider B directly asks the user for auxiliary parameter P or selects the required parameter from the auxiliary parameters P uploaded by the user A along with the instruction.

For the instruction of querying a specified range, the user A can select to compare the values of two columns with each other or the value of a certain column with the same constant to query the specified range; if the user A compares the values of two columns, for example the column A and the column B, and the corresponding column keys are $(m_A, x_A)$ and $(m_B, x_B)$, the service provider B carries out the following calculations:

(I) Calculating the column B' as follows: the $i^{th}$ row element $B'_i=B_i^{N-1} \mod N^2$ of the column B', where $B_i$ is the $i^{th}$ row element of the column B.

(II) Calculating the column A' as follows: the $i^{th}$ row element $A'_i=A_i \times B'_i \times E(\alpha)_i \mod N^2$ of the column A', where $A_i$ is the $i^{th}$ row element of the column A and $E(\alpha)_i$ is the $i^{th}$ row element of the column α of the auxiliary data in step (1.3).

(III) The service provider B puts forward a request for the auxiliary parameters P to the user or selects the required parameter from the auxiliary parameter P uploaded by the user A along with the instruction.

If the user A compares the values of all the rows in a certain column, for example the column A, with the same constant, for example v, the service provider B directly puts forward a request for the auxiliary parameter P to the user or selects the required parameters from the auxiliary parameter P uploaded by the user A along with the instruction.

In step (3.2) the service provider B carries out calculation according to the instruction after receiving the auxiliary parameter P, saves the calculation result after the instruction is run, updates the data and return the query result U to the user A.

Specifically, for the operation of searching for a specified keyword, the user A selects to query whether each row is the same keyword between two columns or whether all rows in a certain column are a certain specified keyword; if the user queries whether each row is the same keyword between two columns, for example the column A and the column B, and the corresponding column keys are $(m_A, x_A)$ and $(m_B, x_B)$, the service provider B receives the auxiliary parameter P: $(\zeta, \eta)$ calculated and uploaded by the user A in step (2), and carries out the following calculations:

(I) Calculation of a column a, wherein the $i^{th}$ row element $a_i$ of the column a is calculated as follows: $a_i=A'_i \times \eta \times E(1)_i^\zeta \mod N^2$, where $A'_i$ is the $i^{th}$ row element of the column A' in step (3.1) and $E(1)_i$ is the $i^{th}$ row element of the column S of the auxiliary data in step (1.3).

(II) Calculation of a column H, wherein the $i^{th}$ row element $H_i$ of the column H is calculated as follows: $H_i=(h_i^{e_i})^{a_i} \mod N_1$, where, $h_i^{e_i}$ is the $i^{th}$ row element of the column h of the auxiliary data in step (1.3), $N_1$ is the $N_1$ described in step (1.3); (III) comparison of $(h^{e_i \cdot (t_i \cdot a_i \mod N) \mod N_2}, H_i)$, where $h^{e_i \cdot (t_i \cdot a_i \mod N) \mod N_2}$ is the $i^{th}$ row element of the column h' of the auxiliary data in the step (1.3), and if they are equal, the elements in the $i^{th}$ rows of the column A and the column B are equal; if not, the elements in the $i^{th}$ rows of the column A and the column B are not equal.

If the user A queries whether all the rows in a certain column, for example the column A, are an external keyword, for example v, the service provider receives the auxiliary parameter P: $(v \cdot \gamma^{-1}, \zeta, \eta)$ uploaded by the user and carries out the following calculations:

(I) Calculation of the column γ', where γ' is a new column calculated by the service provider according to the column γ in the auxiliary data in step (1.3) and the calculated auxiliary parameter P uploaded by the user, and the $i^{th}$ row element $E(\gamma')_i$ of the column γ' is calculated from the $i^{th}$ row element $E(\gamma)_i$ of the column γ: $E(\gamma')_i = E(\gamma)_i^{v \cdot \gamma^{-1}} \mod N^2$.

(II) Calculation of the column A' as follows: the $i^{th}$ row element $A'_i=A_i \times E(\gamma')_i^{N-1} \times E(\alpha)_i \mod N^2$ of the column A', where $A_i$ is the $i^{th}$ row element of the column A and $E(\alpha)_i$ is the $i^{th}$ row element of the column α in the auxiliary data in step (1.3).

(III) Calculation of the column a, wherein the $i^{th}$ row element of the column a is calculated as follows: $a_i=A'_i \times \eta \times E(1)_i^\zeta \mod N^2$, where $A'_i$ is the $i^{th}$ row element of the column A' in step (3.1) and $E(1)_i$ is the $i^{th}$ row element of the column S in the auxiliary data in step (1.3).

(IV) Calculation of the column H, wherein the $i^{th}$ row element $H_i$ of the column H is calculated as follows: $H_i=$ $(h_i^{e_i})^{\alpha_i}$ mod $N_1$, wherein, $h_i^{e_i}$ is the $i^{th}$ row element of the column h in the auxiliary data in step (1.3), and $N_1$ is the $N_1$ described in step (1.3).

(V) Comparison of $(h^{e_i \cdot (t_i \cdot \alpha_i \bmod N) \bmod N_2}, H_i)$, where $h^{e_i \cdot (t_i \cdot \alpha_i \bmod N) \bmod N_2}$ is the $i^{th}$ row element of the column h' in the auxiliary data in step (1.3); if they are equal, the element in the $i^{th}$ row of the column A is equal to v; if they are not equal, the element in the $i^{th}$ row of the column A is not equal to v.

For the instruction of querying a specified range, the user A may select to compare the values of two columns with each other or the value of a certain column with the same constant to query the specified range; if the user compares the values of the same rows between two columns, for example the column A and the column B, and the corresponding column keys of the two columns are $(m_A, x_A)$ and $(m_B, x_B)$, then the service provider B receives the auxiliary parameter P: $(\zeta, \eta)$ uploaded by the user, and carries out the following calculations:

(I) Calculation of the column a, wherein the $i^{th}$ row element $a_i$ of the column a is calculated as follows: $a_i = A'_i \times \eta \times E(1)_i^\zeta \bmod N^2$, where $A'_i$ is the $i^{th}$ row element of the column A' in step (3.1) and $E(1)_i$ is the $i^{th}$ row element of the column S in the auxiliary data in step (1.3).

(II) Calculation of the column a', wherein the $i^{th}$ row element a; of the column a' is calculated as follows: $a'_i = a_i \times (\beta_i \cdot t_i^{-1}) + u_i - \beta_i \alpha_i \bmod N$, where $\beta_i t_i^{-1}$ is the $i^{th}$ row element of the column $\beta$ in the auxiliary data in step (1.3), and $u_i - \beta_i \alpha_i$ is the $i^{th}$ row element of the column u in step (1.3).

(III) Comparison of $a'_i$ with $$\frac{N}{2},$$

wherein if $$a'_i > \frac{N}{2},$$

the element in the $i^{th}$ row of the column A is smaller; otherwise, the element in the $i^{th}$ row of the column B is not greater than the element in the $i^{th}$ row of the column A.

If the user A compares the values of all rows in a certain column, for example, the column A, with the same constant, for example v, the service provider B receives the auxiliary parameter P: $(v \cdot \gamma^{-1}, \zeta, \eta)$ uploaded by the user and carries out the following calculations:

(I) Calculation of the column $\gamma'$, wherein $\gamma'$ is a new column calculated by the service provider according to the column $\gamma$ in the auxiliary data in step (1.3) and the calculated auxiliary parameter P uploaded by the user, and the $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}} \bmod N^2$.

(II) Calculation of the column A' as follows: the $i^{th}$ row element $A'_i = A_i \times E(\gamma')_i^{N-1} \times E(\alpha)_i \bmod N^2$ (i=1, 2, ..., n) of the column A', where $A_i$ is the $i^{th}$ row element of the column A and $E(\alpha)_i$ is the $i^{th}$ row element of the column $\alpha$ in the auxiliary data in step (1.3).

(III) Calculation of the column a, wherein the $i^{th}$ row element $a_i$ of the column a is calculated as follows: $a_i = A'_i \times \eta \times E(1)_i^\zeta \bmod N^2$, where $A'_i$ is the $i^{th}$ row element of the column A' in step (3.1) and $E(1)_i$ is the $i^{th}$ row element of the column S in the auxiliary data in step (1.3).

(IV) Calculation of the column a', wherein the $i^{th}$ row element a; of the column a' is calculated as follows: $a'_i = a_i \times (\beta_i \cdot t_i^{-1}) + u_i - \beta_i \alpha_i \bmod N$, where $\beta_i t_i^{-1}$ is the $i^1$ row element of the column $\beta$ in the auxiliary data in step (1.3) and $u_i - \beta_i \alpha_i$ is the $i^{th}$ row element of the column u in step (1.3).

(V) Comparison of $a'_i$ with $$\frac{N}{2},$$

wherein if $$a'_i < \frac{N}{2},$$

the element in the $i^{th}$ row of the column A is not less than v; otherwise, the element in the $i^{th}$ row of the column A is less than v.

Embodiment 2

The present disclosure discloses a system for encrypting a database supporting composable SQL query, which can perform the functions of safely storing user data and supporting updating, inserting, deleting, adding, searching for a specified keyword and querying a specified range for user data provided by any embodiment of the present disclosure. The system for encrypting a database supporting composable SQL query includes a user device module and a service provider module; the user device module encrypts and preprocesses user data, and uploads the encryption result and preprocessed data to the service provider module; the user module executes data operation instructions, and uploads operation instructions to the service provider module according to actual requirements, wherein the operation instructions include updating, inserting, deleting, adding, searching for a specified keyword and querying a specified ranges, and uploads auxiliary parameter operation instructions to the service provider module, wherein the auxiliary parameter operation instructions include updating, inserting, deleting, adding, searching for a specified keyword and querying a specified range; the service provider module runs the instruction according to the received operation instruction and the auxiliary parameter, stores the calculation result after the instruction is run, updates the data and returns the query result to the user module.

Embodiment 3

In the field of database, an enterprise runs the database test international standard TPC-C for trading, that is, a certain warehouse accepts orders from multiple users at the same time, and the warehouse has multiple transactions with these users at the same time. In order to save memory and improve performance, the warehouse encrypts transaction data and stores it in the cloud. According to the demand of real-time transactions, the warehouse continuously submits SQL instructions to the encrypted data in the cloud (instructions include updating, inserting, deleting, adding, searching for a specified keyword and querying a specified range).

According to the meaning of the instructions for actual transactions, the instructions are divided into five sets:

1. New-Order: the customer enters a new order transaction.
2. Payment: update the customer's account balance and reflect its payment status.
3. Delivery: delivery (simulated batch transaction).

4. Order-Status query: query the status of customers' recent transactions.

5. Stock-Level query: query the stock level of the warehouse so as to replenish the goods in time.

In this embodiment, a server with two 2.5 GHz Intel Xeon Gold 6248 processors and 256 GB memory is used to simulate the cloud service provider, and the method of the present disclosure is used to execute the five sets of instructions respectively, and the time spent is shown in Table 1.

TABLE 1

| Transaction | Time consumed for one operation/ms | Time consumed for two operations/ms | Time consumed for three opeartions/ms |
| --- | --- | --- | --- |
| New-Order | 192023 | 411606 | 614116 |
| Payment | 136020 | 275803 | 417246 |
| Delivery | 422247 | 843313 | 1286638 |
| Order-Status | 346161 | 690062 | 1051611 |
| Stock-Level | 101926 | 204299 | 293828 |

As shown in Table 1 above, the present disclosure supports the execution of five TPC-C transactions. When the five TPC-C transactions are completed once, the shortest time used by the present disclosure is 101 seconds, and the longest time is only 422 seconds (Delivery transactions). As each TPC-C transaction consists of dozens of SQL query instructions, it can be seen that in actual commercial activities, even if the transmission delay is considered, the present disclosure can still be completed in about 10 seconds. In addition, with the increase of the number of executions, the time of the present disclosure is always stable, so it can maintain stable performance in actual commercial activities. Therefore, by using the method of the present disclosure, the database runs faster, consumes less time and runs stably. To sum up, based on the discrete logarithm problem, the present disclosure realizes the encryption protection of user data and reduces the leakage of user privacy information, thus providing a safe and complete protection solution for cloud storage of user data in actual commercial activities; according to the present disclosure, the composable SQL query instructions can be safely and efficiently executed on encrypted data, and the instructions include updating, inserting, deleting, adding, searching for a specified keyword and querying a specified range, so that the requirements of users for remote operation and query of cloud storage data in actual commercial activities are met; the present disclosure has the advantages of strong universality, safety and high efficiency, privacy protection, simple and convenient use, high efficiency, less memory and time consumption and the like.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

What is described above is only preferred embodiments of the present disclosure, and it is not intended to limit the present disclosure. Any modifications, equivalents, improvements and the like made within the spirit and principle of the present disclosure shall be included in the scope of protection of the present disclosure.

What is claimed is:

1. A database encryption method supporting composable SQL query, comprising the following steps:

step (1) encrypting stored data, wherein a user encrypts and preprocesses his own stored data, and uploads an encryption result and preprocessed data to a service provider who provides software, apparatuses, electronic devices or storage media for running a database to store the data uploaded by the user; and wherein the step (1) comprises the following sub-steps:

step (1.1) generating, by the user, random number sets as a row key and a column key of the data for his own data; encrypting, by the user, the data with the row key and the column key based on multiplication encryption, and outputting an encrypted database;

step (1.2) uploading, by the user, the encrypted database to the service provider, and selecting any encryption scheme to encrypt and upload the row key generated in step (1.1) to the service provider to implement

19 encrypted storage of the row key, and meanwhile selectively storing the column key locally without encryption as needed or encrypting and uploading the column key to the service provider;

step (1.3) preprocessing, by the user, an instruction to generate auxiliary data needed to run the instruction; uploading, by the user, the auxiliary data to the service provider, wherein the service provider is not capable of obtaining any privacy information about the database from the auxiliary data, and the instruction comprises operations of updating, inserting, deleting, adding, searching for a certain specified keyword and querying a specified range; and step (1.4) selecting, by the service provider, a storage form according to an actual situation, wherein the storage form comprises database software, apparatuses, electronic devices or storage media; storing the encrypted data and the auxiliary data based on the storage form, and carrying out execution of subsequent instructions;

step (2) setting a composable SQL query instruction, and uploading, by the user, the composable SQL query instruction to the service provider according to actual demands, and uploading auxiliary parameters used for the query instruction; and step (3) running the composable SQL query instruction set in step (2), wherein the service provider runs the query instruction according to the received composable SQL query instruction and the auxiliary parameters from the user, saves a calculation result after the instruction is run, and updates the data and returns a query result to the user.

2. The database encryption method supporting composable SQL query according to claim 1, wherein the step (1.1) is as follows:

the user randomly generates two large prime numbers p and q to obtain a large integer N=p·q; the user takes the large integer N as an order of an generator g and finds out the generator g on a finite field $Z_{N^2}$; the user takes the randomly generated numbers as the row key and the column key, and encrypts the database by using the row key and the column key, wherein the row key of an $i^{th}$ row is $(r_i, t_i) \in Z_N^2$; the column key of a $j^{th}$ column is $(m_j, x_j)$, where $m_j \in Z_{N^2}$, $x_j \in Z_N$; the row key and the column key meets a requirement that an integer $M_{(i,j)} \in Z_{N^2}$ for any i, j, renders $m_j g^{r_i x_j} \cdot M_{(i,j)} \mod N^2 = 1$, the integer $M_{(i,j)}$ is defined as an inverse of $N^2$ relative to $m_j g^{r_i x_j}$, and is denoted as $(m_j g^{r_i x_j})^{-1}$; an element yap in the $i^{th}$ row and the $j^{th}$ column of the database is encrypted as follows:

$$c_{(i,j)} = (N+1)^{t_i v(i,j)} \cdot (m_j g^{r_i x_j})^{-1} \mod N^2.$$

3. The database encryption method supporting composable SQL query according to claim 1, wherein the step (1.3) is as follows:

for the instructions of deleting and adding, it is not required for the user to generate auxiliary data D;

for the instructions of updating and inserting, once a user updates or inserts a row of data, it is required to generate a row key in advance and encrypt and store the row key in the service provider; during updating and inserting, the user downloads the row key generated in advance from the service provider, and obtains the column key from the service provider or locally, so as to decrypt and update the updated data, re-encrypt and

20 upload the data to the service provider or directly encrypt the inserted data and upload the data to the service provider;

for the instruction of searching for a certain specified keyword, the user is allowed to select to query whether each row is a same keyword between two columns or to query whether all rows in a certain column are a certain specified keyword; when the user queries whether the same row of two columns is a same keyword, it is required for the user to generate a column of encrypted random numbers $\alpha_i$ (i=1, 2, ..., n) for each query, and a corresponding column key is $(m_\alpha, x_\alpha)$, and an encryption scheme is $E(\alpha_i) = (m_\alpha \cdot g^{r_i x_\alpha})^{-1} \cdot (N+1)^{t_i \alpha} \mod N^2$; an encrypted element in each row is 1, and this column is collectively defined as a column S; the column key corresponding to the column S is $(m_s, x_s)$, and an element 1 in the $i^{th}$ row is encrypted as $E(1)_i = (m_s \cdot g^{r_i x_s})^{-1} \cdot \mod N^2$, where $m_s$ has an inverse $m_s^{-1} \in Z_{N^2}$ for $N^2$, namely $m_s \cdot m_s^{-1} \mod N^2 = 1$; $x_s$ has an inverse $x_s^{-1} \in Z_N$ for N, namely $x_s \cdot x_s^{-1} \mod N = 1$; a list of random numbers $h_i^{e_i}$ (i=1, 2, ..., n), where $h_i$ is an $N_2$ order generator on $Z_{N_1}$, $N_1$ is a product of two or more random large prime numbers, and $N_2$ is any one of the large prime numbers, that is, $N_2$ is divisible by $N_1$, $e_i$ is a random integer on $Z_{N_2}$; a list of numbers $h^{e_i \cdot (t_i \cdot \alpha_i \mod N) \mod N_2}$ (i=1, 2, ..., N); when the user queries whether all rows of a certain column are a certain specified keyword, it is required for the user to generate an additional encrypted column of γ for every query in addition to auxiliary data required for compare the two columns to determine whether each row is a same keyword, that is, an encrypted element of each row is γ, and a corresponding column key is $(m_\gamma, x_\gamma)$, and the element in the $i^{th}$ row is encrypted as $E(\gamma)_i = (m_\gamma \cdot g^{r_i x_\gamma})^{-1} \cdot (N+1)^{t_i \gamma}$, where γ is a random number on $Z_N$, and γ meets a requirement that an inverse $\gamma^{-1} \in Z_N$ relative to N exists, that is, $\gamma \cdot \gamma^{-1} \mod N = 1$;

for the instruction of querying the specified range, the user is allowed to select to compare two columns with each other or to select to compare a column with a same constant to query the specified range; when the user compares two columns with each other, it is required to generate a column of encrypted random numbers $\alpha_i$(i=1, 2, ..., n) for each comparison operation, the corresponding column key is $(m_\alpha, x_\alpha)$, and an encryption scheme is $E(\alpha_i) = (m_\alpha \cdot g^{r_i x_\alpha})^{-1} \cdot (N+1)^{t_i \alpha} \mod N^2$; an encrypted element in each row is 1, and the two columns are collectively defined as a column S; a column key corresponding to the column S is $(m_s, x_s)$, and the element 1 in the $i^{th}$ row is encrypted as $E(1)_i = (m_s \cdot g^{r_i x_s})^{-1} \cdot 1 \mod N^2$, where $m_s$ has an inverse of $m_s^{-1} \in Z_{N^2}$ relative to $N^2$, namely $m_s \cdot m_s^{-1} \mod N^2 = 1$; $x_s$ has an inverse of $x_s^{-1} \in Z_N$ relative to N, namely $x_s \cdot x_s^{-1} \mod N = 1$; a column $\beta_i \cdot t_i^{-1}$ (i=1, 2, ..., n), a column $u_i - \beta_i \cdot \alpha_i$, where $t_i^{-1} \in Z_N$ is an inverse of $t_i$ relative to N, namely $t_i^{-1} \cdot t_i \mod N = 1$, $\beta_i$, $u_i$ is a random number on $Z_N$ and satisfies $$0 \ll u_i \ll \beta_i \ll \frac{N}{2};$$

when the user compares a column with the same constant, it is required for the user to generate an additional encrypted column of γ in addition to auxiliary data required for comparing the two columns, that is, the encrypted element in each row is $\gamma$, the corresponding column key is $(m_\gamma, x_\gamma)$, and the element in the $i^{th}$ row is encrypted as $E(\gamma)_i = (m_\gamma \cdot g^{r \cdot x_\gamma})^{-1} \cdot (N+1)^{r/\gamma}$, where $\gamma$ is a random number on $Z_N$, and $\gamma$ meets a requirement that an inverse $\gamma^{-1} \in Z_N$ relative to N exists, that is, $\gamma \cdot \gamma^{-1}$ mod $N=1$.

4. The database encryption method supporting composable SQL query according to claim 1, wherein the step (2) specifically comprises following sub-steps:

step (2.1) uploading, by the users, operation instructions to the service provider according to actual business requirements, wherein the operation instructions comprise updating, adding, searching for a certain specified keyword and querying a specified range;

step (2.2) calculating, by the users, the auxiliary parameters according to the uploaded instructions, and uploading the auxiliary parameters to the service provider along with the instructions or after receiving a request of the service provider;

wherein the step (2.2) is as follows: the user does not need to calculate any auxiliary parameters for the operations of updating, inserting and deleting; for the operation of adding, when a column A and a column B are added, and corresponding column keys are $(m_A, x_A)$ and $(m_B, x_B)$, the column key of a newly generated column $C=A+B$ is calculated and stored by the user; the corresponding calculation mode is $(m_C = m_A \cdot m_B$ mod $N^2$, $x_C = x_A + x_B$ mod $N$); the user selects to store the key locally without encryption or encrypt and upload the key to the service provider for storage; for the instruction of searching for a certain specified keyword, the user selects to query whether each row is a same keyword between two columns or to query whether all rows of a certain column are a certain specified keyword; when the user queries whether each row is the same keyword between two columns such as the column A and the column B, and the corresponding column keys are $(m_A, x_A)$ and $(m_B, x_B)$, the user needs to calculate:

(I) a column key $(m_{A'} = m_A \cdot m_B^{-1} \cdot m_\alpha$ mod $N^2$, $x_{A'} = x_A - x_B + x_\alpha$ mod $N$) of a column $A' = A - B + \alpha$;

(II) calculating the auxiliary parameter $\zeta = -x_s^{-1} x_{A'}$ mod $N$, $\eta = m_A m_s^\zeta$ mod $N^2$ to obtain the auxiliary parameter $(\zeta, \eta)$ uploaded by the user at last;

when the user queries whether all rows in a certain column such as the column A, are a certain specified keyword such as v, the user needs to calculate:

(I) $v \cdot \gamma^{-1}$, where $\gamma$ is the auxiliary data in step (1.3);

(II) the column key $(m_{\gamma'} = m_\gamma^{v \cdot \gamma^{-1}}$ mod $N^2$, $x_{\gamma'} = v \cdot \gamma^{-1} \cdot x_\gamma$ mod $N$) of the column $\gamma' = E(\gamma)^{v \cdot \gamma^{-1}}$, where the column $\gamma'$ is a new column calculated by the service provider from $\gamma$, and the $i^{th}$ element $E(\gamma')_i$ of the column $\gamma'$ is calculated from the $i^{th}$ element $E(\gamma)_i$ of the column $\gamma$: $E(\gamma')_i = E(\gamma)_i^{v \cdot \gamma^{-1}}$ mod $N^2$;

(III) the column key $(m_{A'} = m_A \cdot (m_{\gamma'})^{-1} \cdot m_\alpha$ mod $N^2$, $x_{A'} = x_A - x_{\gamma'} + x_\alpha$ mod $N$) of a column $A' = A - \gamma' + \alpha$;

(IV) calculating the auxiliary parameter P: $\zeta = -x_s^{-1} x_{A'}$ mod $N$, $\eta = m_A m_s^\zeta$ mod $N^2$; obtaining the auxiliary parameter $(v \cdot \gamma^{-1}, \zeta, \eta)$ uploaded by the user at last;

for the instruction of querying a specified range, the user selects to compare the values of two columns with each other or compare the value of a column with the same constant to query the specified range; when the user compares the values between the same rows of the two columns, such as the column A and the column B, and the column keys corresponding to the two columns are $(m_A, x_A)$ and $(m_B, x_B)$, the user needs to calculate:

(I) the column key $(m_{A'} = m_A \cdot m_B^{-1} \cdot m_\alpha$ mod $N^2$, $x_{A'} = x_A - x_B + x_\alpha$ mod $N$) of the column $A' = A - B + \alpha$; (2) $\zeta = -x_s^{-1} x_{A'}$ mod $N$, $\eta = m_A m_s^\zeta$ mod $N^2$; and obtaining the auxiliary parameter $(\zeta, \eta)$ uploaded by the user at last;

wherein when the user compares the values of all rows in a certain column such as the column A, with a same constant such as v, the user needs to calculate:

(I) $v \cdot \gamma^{-1}$, where $\gamma$ is the auxiliary data in step (1.3);

(II) calculating the column key $(m_{\gamma'} = m_\gamma^{v \cdot \gamma^{-1}}$ mod $N^2$, $x_{\gamma'} = v \cdot \gamma^{-1} \cdot x_\gamma$ mod $N$) of the column $\gamma'$, wherein the column $\gamma'$ is a new column calculated by the service provider from the column $\gamma$, and an $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}}$ mod $N^2$;

(III) calculating the column key $(m_{A'} = m_A \cdot (m_{\gamma'})^{-1} \cdot m_\alpha$ mod $N^2$, $x_{A'} = x_A - x_{\gamma'} + x_\alpha$ mod $N$) of the column $A' = A - \gamma' + \alpha$;

(IV) calculating the auxiliary parameter $\zeta = -x_s^{-1} x_{A'}$ mod $N$, $\eta = m_A m_s^\zeta$ mod $N^2$; and obtaining the auxiliary parameter $(v \cdot \gamma^{-1}, \zeta, \eta)$ uploaded by the user at last.

5. The database encryption method supporting composable SQL query according to claim 1, wherein the step (3) specifically comprises the following sub-steps:

step (3.1) the service provider performing corresponding calculation and operation after receiving the composable SQL query instruction of the user, and putting forward a request for the auxiliary parameters to the user according to the requirements in the calculation or selecting required parameters from the auxiliary parameters uploaded by the user along with the instruction;

step (3.2) the service provider carrying out calculation according to the instruction after receiving the auxiliary parameters, saves the calculation result after the instruction is run, updates the data and return the query result to the user.

6. The database encryption method supporting composable SQL query according to claim 5, wherein the step (3.1) is as follows: for the instruction of deleting, the service provider only needs to perform a normal deletion operation and update the database; for operations of insertion and update, when the user encrypts and stores the row key and column key at the service provider, the service provider only needs to return the row key and column key requested by the user and receive the new data uploaded by the user for normal insertion and update; for the operation of addition, when the column A and the column B are added to get a column C, the service provider calculates the $i^{th}$ row element $C_i$ of the column C as follows: $C_i = A_i \times B_i$ ($i=1,2,3, \ldots$ n), where $A_i$ and $B_i$ represent the $i^{th}$ row elements of the column A and the column B, respectively; in the operation of the above instructions, the service provider does not need the user to provide any auxiliary parameters;

for the operation of searching for a certain specified keyword, the user selects to query whether each row is the same keyword between two columns or whether all rows in a certain column are a certain specified keyword; when the user queries whether each row is the same keyword between two columns such as the column A and the column B, and the corresponding column keys are $(m_A, x_A)$ and $(m_B, x_B)$, the service provider performs following calculations:

(I) calculating a column B' as follows: an $i^{th}$ row element $B'_i = B_i^{N-1}$ mod $N^2$ of the column B', where $B_i$ is the $i^{th}$ row element of the column B;

(II) calculating a column A' as follows: the $i^{th}$ row element $A'_i = A_i \times B'_i \times E(\alpha)_i$ mod $N^2$ of the column A', where $A_i$ is the $i^{th}$ row element of the column A and $E(\alpha)_i$ is the $i^{th}$ row element of the column $\alpha$ of the auxiliary data in step (1.3);

(III) the service provider requesting the auxiliary parameter P to the user or selects the required parameter from the auxiliary parameters uploaded by the user along with the instruction;

when the user queries whether all the rows in a certain column such as the column A, are an external keyword such as v, the service provider directly asks the user for auxiliary parameters or selects the required parameters from the auxiliary parameters uploaded by the user along with the instruction;

for the instruction of querying a specified range, the user is allowed to select to compare the values of two columns with each other or the value of a certain column with the same constant to query the specified range; when the user compares the values of two columns such as the column A and the column B, and the corresponding column keys are $(m_A, x_A)$ and $(m_B, x_B)$, the service provider carries out the following calculations:

(I) calculating the column B' as follows: the $i^{th}$ row element $B'_i = B_i^{N-1} \mod N^2$ of the column B', where $B_i$ is the $i^{th}$ row element of the column B;

(II) calculating the column A' as follows: the $i^{th}$ row element $A'_i = A_i \times B'_i \times E(\alpha)_i \mod N^2$ of the column A', where $A_i$ is the $i^{th}$ row element of the column A and $E(\alpha)_i$ is the $i^{th}$ row element of the column $\alpha$ of the auxiliary data in step (1.3);

(III) the service provider puts forward a request for the auxiliary parameters to the user or selects the required parameters from the auxiliary parameters uploaded by the user along with the instruction;

when the user compares the values of all the rows in a certain column such as the column A, with the same constant such as v, the service provider directly puts forward a request for the auxiliary parameters to the user or selects the required parameters from the auxiliary parameters uploaded by the user along with the instruction.

7. The database encryption method supporting composable SQL query according to claim 5, wherein the step (3.2) is as follows: for the operation of searching for a specified keyword, the user selects to query whether each row is the same keyword between two columns or to query whether all rows in a certain column are a certain specified keyword; when the user queries whether each row is the same keyword between two columns such as the column A and the column B, and the corresponding column keys are $(m_A, x_A)$ and $(m_B, x_B)$, the service provider receives the auxiliary parameter $(\zeta, \eta)$ calculated and uploaded by the user in step (2), and carries out the following calculations:

(I) calculation of a column a, wherein the $i^{th}$ row element $a_i$ of the column a is calculated as follows: $a_i = A'_i \times \eta \times E(1)_i^\zeta \mod N^2$, where $A'_i$ is the $i^{th}$ row element of the column A' in step (3.1) and $E(1)_i$ is the $i^{th}$ row element of the column S of the auxiliary data in step (1.3);

(II) calculation of a column H, wherein the $i^{th}$ row element $H_i$ of the column H is calculated as follows: $H_i = (h_i^{e_i})^{a_i} \mod N_1$, where, $h_i^{e_i}$ is the $i^{th}$ row element of the column h of the auxiliary data in step (1.3), $N_1$ is the $N_1$ described in step (1.3);

(III) comparison of $(h^{e_i \cdot (t_i \cdot \alpha_i \mod N) \mod N_2}, H_i)$, where $h^{e_i \cdot (t_i \cdot \alpha_i \mod N) \mod N_2}$ is the $i^{th}$ row element of the column h' of the auxiliary data in the step (1.3), and when $(h^{e_i \cdot (t_i \cdot \alpha_i \mod N) \mod N_2}, H_i)$ and $H_i$ are equal, elements in the $i^{th}$ rows of the column A and the column B are equal; when $(h^{e_i \cdot (t_i \cdot \alpha_i \mod N) \mod N_2}, H_i)$ and $H_i$ are not equal, the elements in the $i^{th}$ rows of the column A and the column B are not equal;

when the user queries whether all the rows in a certain column such as the column A, are an external keyword such as v, the service provider receives the auxiliary parameter $(v \cdot \gamma^{-1}, \zeta, \eta)$ uploaded by the user and carries out following calculations:

(I) calculating the column $\gamma'$, where $\gamma'$ is a new column calculated by the service provider according to the column $\gamma$ in the auxiliary data in step (1.3) and the calculated auxiliary parameter P uploaded by the user, and the $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}} \mod N^2$;

(II) calculating the column A' as follows: the $i^{th}$ row element $A'_i = A_i \times E(\gamma')_i^{N-1} \times E(\alpha)_i \mod N^2$ of the column A', where $A_i$ is the $i^{th}$ row element of the column A and $E(\alpha)_i$ is the $i^{th}$ row element of the column $\alpha$ in the auxiliary data in step (1.3);

(III) calculating the column a, wherein the $i^{th}$ row element of the column a is calculated as follows: $a_i = A'_i \times \eta \times E(1)_i^\zeta \mod N^2$, where $A'_i$ is the $i^{th}$ row element of the column A' in step (3.1) and $E(1)_i$ is the $i^{th}$ row element of the column S in the auxiliary data in step (1.3);

(IV) calculating the column H, wherein the $i^{th}$ row element $H_i$ of the column H is calculated as follows: $H_i = (h_i^{e_i})^{a_i} \mod N_1$, wherein, $h_i^{e_i}$ is the $i^{th}$ row element of the column h in the auxiliary data in step (1.3), and $N_1$ is the $N_1$ described in step (1.3);

(V) comparing $(h^{e_i \cdot (t_i \alpha_i \mod N) \mod N_2}, H_i)$, where $h^{e_i \cdot (t_i \alpha_i \mod N) \mod N_2}$ is the $i^{th}$ row element of the column h' in the auxiliary data in step (1.3); when $(h^{e_i \cdot (t_i \alpha_i \mod N) \mod N_2}, H_i)$ and $H_i$ are equal, the element in the $i^{th}$ row of the column A is equal to v; when $(h^{e_i \cdot (t_i \alpha_i \mod N) \mod N_2}, H_i)$ and $H_i$ are not equal, the element in the $i^{th}$ row of the column A is not equal to v;

for the instruction of querying a specified range, the user selects to compare the values of two columns with each other or the value of a certain column with the same constant to query the specified range; when the user compares the values of the same rows between two columns such as the column A and the column B, and the corresponding column keys of the two columns are $(m_A, x_A)$ and $(m_B, x_B)$, then the service provider receives the auxiliary parameter P: $(\zeta, \eta)$ uploaded by the user, and carries out the following calculations:

(I) calculating the column a, wherein the $i^{th}$ row element $a_i$ of the column a is calculated as follows: $a_i = A'_i \times \eta \times E(1)_i^\zeta \mod N^2$, where $A'_i$ is the $i^{th}$ row element of the column A' in step (3.1) and $E(1)_i$ is the $i^{th}$ row element of the column S in the auxiliary data in step (1.3);

(II) calculating the column a', wherein the $i^{th}$ row element $a'_i$ of the column a' is calculated as follows: $a'_i = a_i \times (\beta_i \cdot t_i^{-1}) + u_i - \beta_i \alpha_i \mod N$, where $\beta_i t_i^{-1}$ is the $i^{th}$ row element of the column $\beta$ in the auxiliary data in step (1.3), and $u_i - \beta_i \alpha_i$ is the $i^{th}$ row element of the column u in step (1.3);

(III) comparing $a'_i$ with $$\frac{N}{2},$$

wherein when $$a'_i > \frac{N}{2},$$

the element in the $i^{th}$ row of the column A is smaller; otherwise, the element in the $i^{th}$ row of the column B is not greater than the element in the $i^{th}$ row of the column A;

when the user compares the values of all rows in a certain column such as the column A, with the same constant such as v, the service provider receives the auxiliary parameter $(v \cdot \gamma^{-1}, \zeta, \eta)$ uploaded by the user and carries out the following calculations:

(I) calculating the column $\gamma'$, wherein $\gamma'$ is a new column calculated by the service provider according to the column $\gamma$ in the auxiliary data in step (1.3) and the calculated auxiliary parameter P uploaded by the user, and the $i^{th}$ row element $E(\gamma')_i$ of the column $\gamma'$ is calculated from the $i^{th}$ row element $E(\gamma)_i$ of the column $\gamma$: $E(\gamma')_i = E(\gamma)_i^{v \cdot \gamma^{-1}} \mod N^2$;

(II) calculating the column A' as follows: the $i^{th}$ row element $A'_i = A_i \times E(\gamma')_i^{N-1} \times E(\alpha)_i \mod N^2$ (i=1, 2, ..., n) of the column A', where $A_i$ is the $i^{th}$ row element of the column A and $E(\alpha)_i$ is the $i^{th}$ row element of the column $\alpha$ in the auxiliary data in step (1.3);

(III) calculating the column a, wherein the $i^{th}$ row element $a_i$ of the column a is calculated as follows: $a_i = A'_i \times \eta \times E(1)_i^\zeta \mod N^2$, where $A'_i$ is the $i^{th}$ row element of the column A' in step (3.1) and $E(1)_i$ is the $i^{th}$ row element of the column S in the auxiliary data in step (1.3);

(IV) calculating the column a', wherein the $i^{th}$ row element $a'_i$ of the column a' is calculated as follows: $a'_i = a_i \times (\beta_i \cdot t_i^{-1}) + u_i - \beta_i \alpha_i \mod N$, where $\beta_i \cdot t_i^{-1}$ is the $i^{th}$ row element of the column $\beta$ in the auxiliary data in step (1.3) and $u_i - \beta_i \alpha_i$ is the $i^{th}$ row element of the column u in step (1.3);

(V) comparing $a'_i$ with $$\frac{N}{2},$$

wherein if $$a'_i < \frac{N}{2},$$

the element in the $i^{th}$ row of the column A is not less than v; and if not, the element in the $i^{th}$ row of the column A is less than v.

* * * * *